(12) United States Patent
Gaudaen

(10) Patent No.: US 12,325,171 B2
(45) Date of Patent: Jun. 10, 2025

(54) METHOD FOR MANUFACTURING A FILM COMPRISING CAVITIES WITH DETERMINATION OF STRETCH, DENSITY, THICKNESS AND/OR POROSITY PROFILES OF THE FILM

(71) Applicant: ALEPH SAS, La Motte Servolex (FR)

(72) Inventor: Jan Gaudaen, Aix les Bains (FR)

(73) Assignee: ALEPH SAS, La Motte Servolex (FR)

( * ) Notice: Subject to any disclaimer, the term of this patent is extended or adjusted under 35 U.S.C. 154(b) by 411 days.

(21) Appl. No.: 17/762,773

(22) PCT Filed: Sep. 9, 2020

(86) PCT No.: PCT/EP2020/075143
§ 371 (c)(1),
(2) Date: Mar. 23, 2022

(87) PCT Pub. No.: WO2021/063641
PCT Pub. Date: Apr. 8, 2021

(65) Prior Publication Data
US 2022/0362984 A1 Nov. 17, 2022

(30) Foreign Application Priority Data
Oct. 3, 2019 (FR) .................................... 1910947

(51) Int. Cl.
*B29C 48/92* (2019.01)
*B29C 48/00* (2019.01)
(Continued)

(52) U.S. Cl.
CPC .......... *B29C 48/92* (2019.02); *B29C 48/0018* (2019.02); *B29C 48/0022* (2019.02);
(Continued)

(58) Field of Classification Search
CPC ..... B29C 48/92; B29C 48/0022; B29C 48/31; B29C 48/313
See application file for complete search history.

(56) References Cited

U.S. PATENT DOCUMENTS 5,928,580 A  7/1999  Nitta et al.
5,961,923 A  10/1999  Nova et al.
(Continued)

FOREIGN PATENT DOCUMENTS

CN  101072671 A  11/2007
CN  101233176 A  7/2008
(Continued)

OTHER PUBLICATIONS

French Search Report dated May 18, 2020 issued by the INPI in corresponding Application No. FR 1910947, 2 pages.
(Continued)

*Primary Examiner* — Xiao S Zhao
*Assistant Examiner* — Nicholas J Chidiac
(74) *Attorney, Agent, or Firm* — Ware, Fressola, Maguire & Barber LLP

(57) ABSTRACT

A method of manufacturing a film including cavities and formed from a polymer in which a cavitating agent is dispersed, the method including a step of extruding the polymer through an extrusion die equipped with adjustment actuators for adjusting thickness of the extruded film, and a step of stretching the film, as well as establishing a mapping function of the film on the basis of mass-per-unit-area profiles of the film before and after the stretching step, establishing a stretch profile of the film as stretched on the basis of the mapping function and of said transverse mass-per-unit-area profiles, and establishing a characteristic transverse profile that is characteristic of the film on the basis of the stretch profile and of a transverse profile of the concen-
(Continued)

tration by mass of cavitating agent in the film as stretched that makes it possible to take into account the distribution of the cavities in the film; in which method the adjustment actuators are controlled as a function of said characteristic transverse profile.

17 Claims, 6 Drawing Sheets

(51) Int. Cl.
*B29C 48/08* (2019.01)
*B29C 48/31* (2019.01)
*B29C 55/00* (2006.01)
*B29C 55/02* (2006.01)
*B29C 55/12* (2006.01)
*G01N 23/083* (2018.01)
*B29K 105/04* (2006.01)
*B29L 7/00* (2006.01)

(52) U.S. Cl.
CPC ............ *B29C 48/023* (2019.02); *B29C 48/08* (2019.02); *B29C 48/31* (2019.02); *B29C 55/005* (2013.01); *B29C 55/02* (2013.01); *B29C 55/12* (2013.01); *G01N 23/083* (2013.01); *B29C 48/022* (2019.02); *B29C 48/313* (2019.02); *B29C 2948/9219* (2019.02); *B29C 2948/92447* (2019.02); *B29K 2105/04* (2013.01); *B29L 2007/008* (2013.01); *G01N 2223/04* (2013.01); *G01N 2223/61* (2013.01)

(56) References Cited

U.S. PATENT DOCUMENTS

| 7,813,829 B2 * | 10/2010 | Terao ...................... B29C 55/12 |
| | | 700/197 |
| 10,926,446 B1 * | 2/2021 | Ouderkirk ................ G02B 3/14 |
| 11,046,062 B2 * | 6/2021 | Li ........................ B29C 48/0022 |
| 2002/0006756 A1 | 1/2002 | Mercure et al. |
| 2002/0149132 A1 | 10/2002 | Takata et al. |
| 2006/0121269 A1 | 6/2006 | Miller et al. |
| 2009/0045536 A1 * | 2/2009 | Terao ...................... B29C 48/91 |
| | | 425/4 R |
| 2016/0193774 A1 | 7/2016 | Martena |
| 2019/0202185 A1 * | 7/2019 | Li ............................ B32B 27/08 |

FOREIGN PATENT DOCUMENTS

| CN | 101365571 A | 2/2009 |
| CN | 106660253 A | 5/2017 |
| CN | 107175807 A | 9/2017 |
| CN | 109195769 A | 1/2019 |
| CN | 109565549 A | 4/2019 |
| EP | 0626247 A1 | 11/1994 |
| EP | 3124201 A1 | 2/2017 |
| JP | 2007176167 A | 7/2007 |
| WO | 2010/059448 A1 | 5/2010 |
| WO | 2014186604 A1 | 11/2014 |

OTHER PUBLICATIONS

PCT International Search Report and Written Opinion dated Jan. 13, 2021 issued in corresponding Application No. PCT/EP2020/075143, 7 pages.

Taiwanese Office Action dated Oct. 25, 2021 issued by the TIPLO in corresponding Application No. 109132579, 4 pages.

Office Action, Application No. CN 202080069822.9, dated Oct. 11, 2023, 7 pages.

Office Action, Application No. BR112022005138-7, dated Oct. 17, 2023, 5 pages.

* cited by examiner

METHOD FOR MANUFACTURING A FILM COMPRISING CAVITIES WITH DETERMINATION OF STRETCH, DENSITY, THICKNESS AND/OR POROSITY PROFILES OF THE FILM

CROSS REFERENCE TO RELATED APPLICATIONS

This application is the U.S. National Stage of PCT/EP2020/075143 filed on Sep. 9, 2020, which application claims priority under 35 USC § 119 to French Patent Application No. 1910947 filed on Oct. 3, 2019. Both of these applications are hereby incorporated by reference in their entirety.

TECHNICAL FIELD

The invention relates to a method of manufacturing a film in which cavities or voids are generated during one or more stretching steps, with steps for characterizing the film.

PRIOR ART

A film based on a polymer material may be made porous by stretching when a cavitating material is mixed finely with the polymer.

A film stretched longitudinally, i.e. in the direction in which the film advances, has its length increased.

A film stretched longitudinally can undergo shrinkage in the transverse direction and can therefore have its width reduced.

A film stretched transversely, i.e. transversely to the direction of advance of the film, has its width increased.

A film is often stretched transversely and longitudinally, either sequentially or simultaneously.

A cavitating agent is a material dispersed in the polymer in which the islands of cavitating agent mechanically cause cavities or voids to appear in the volumes around them during the stretching, as disclosed in the publications of Patent Documents US 2006/0121259 and WO 2010/059448.

Characterization techniques taking into account the deformation of such a film and the distribution of its component matter during the stretching have been developed, with a view to optimizing the manufacturing method in general and the stretching step in particular.

For example, U.S. Pat. No. 7,813,829 discloses characterizing the thickness of a film, firstly after it has been extruded and upstream from transverse stretching, and then secondly downstream from said transverse stretching.

Techniques for characterizing a film on its production line are based on sensors, the principle of which is to sense absorption of radiation or of a wave, and which naturally report the distribution of the matter.

The distribution of the matter while a film is being manufactured leads to defining a mapping function that establishes correspondence between a transverse position in the film before stretching and a transverse position in the film after stretching.

Furthermore, if the sensors implemented make it possible to characterize the edges of the film accurately, it is possible to define the mapping function by plotting the curves representing cumulative mass per unit area in the transverse direction on the basis of the mass-per-unit-area measurements.

FIG. 1A shows mass-per-unit-area profiles C1 and C2 of the film respectively before and after it has been stretched, with the transverse locations $X_{min}$ and $X_{max}$ corresponding to the edges of the film before stretching, and the transverse locations $X_{min}'$ and $X_{max}'$ corresponding to the edges of the film after stretching.

FIG. 1B shows curves C3 and C4 for mass per unit area that is cumulative in the transverse direction and normalized, which curves are taken from respective ones of the curves C1 and C2 of FIG. 1A, respectively before and after stretching.

In this example, the mapping function is defined as a correspondence between a transverse location $X'$ of the film after stretching with a cumulative and normalized mass per unit area $Y'$ and the transverse location $X$ of the film before stretching with the cumulative and normalized mass per unit area $Y$, where $Y$ is equal to $Y'$.

With a film that does not have cavities, a thickness profile can be deduced directly from a mass-per-unit-area profile, by dividing the mass-per-unit-area values (expressed, for example, in grams per square meter ($g/m^2$)) by the density of the film (expressed, for example, in grams per cubic meter ($g/m^3$)) which, in such a situation, is a constant.

The combination of knowing the mapping function and of characterizing the thickness profile of the film after stretching makes it possible to adjust the manufacturing parameters acting on the thickness profile of the film upstream from the stretching in such a manner as to render the film of uniform thickness after the stretching, as disclosed in U.S. Pat. Nos. 5,928,580 and 7,813,829.

In this context, characterizing the thickness profile of the film is thus an unavoidable step in monitoring and controlling the manufacturing method.

However, with films that include cavities, such as microporous membranes, breathable films, or "pearlized" films, a thickness profile cannot be deduced satisfactorily from a mass-per-unit-area profile.

Indeed, regardless of whether they are based on beta rays, X rays, or infrared rays, or on ultrasound, the techniques for measuring mass per unit area of films rely on measuring a quantity of matter and do not directly provide the thickness of the film to be characterized.

The thickness at a given point of the film is given by the ratio between its mass per unit area and its density at that point.

Conventionally, since the local density is not known, it is assumed to be constant.

However, in practice, for a porous film, it is possible that the cavities might not be uniformly distributed in the film, in which case the assumption of the density being constant is no longer true, and the characterization of its thickness is subject to errors.

In addition, even when a non-uniform density is estimated predictively based on knowledge of the machines and of the methods used, such an estimation remains empirical and does not make it possible to adapt to a new situation or to react when faced with unexpected changes.

Thus, conventional methods of characterizing a film including cavities remain insufficiently reliable and accurate, and do not make it possible to cope with unforeseen changes in the characteristics of a film that is being formed.

SUMMARY OF THE INVENTION

An object of the invention is to improve a method of manufacturing a film including cavities by improving monitoring of the characteristics of such a film, by increasing the accuracy of the measurements of characteristic profiles of the film, in particular the stretch, density, thickness and/or porosity profiles.

The method of the invention makes it possible to characterize reliably a film having a density that varies due to non-uniform distribution of closed and/or through cavities or voids in the film, including porosity.

To this end the invention provides a method of manufacturing a film including cavities and formed from a polymer in which a cavitating agent is dispersed, said method including a step of extruding the polymer on a production line equipped with adjustment actuators for adjusting characteristics of the extruded film, and a step of stretching the film, as well as a step consisting in establishing a mapping function of the film, wherein: a first mass-per-unit-area sensor measures a transverse mass-per-unit-area profile of the film as not stretched; a second mass-per-unit-area sensor measures a transverse mass-per-unit-area profile of the film as stretched by said stretching; a computer unit computes (S50a, S150a) said mapping function of the film as stretched on the basis of said transverse mass-per-unit-area profiles; said computer unit computes a stretch profile of the film as stretched on the basis of said mapping function and of said transverse mass-per-unit-area profiles; said computer unit computes a characteristic transverse profile that is characteristic of the film on the basis of said stretch profile and of a transverse profile of the concentration by mass of cavitating agent in the film as stretched that makes it possible to take into account the distribution of the cavities and of their sizes in the film; and said adjustment actuators are controlled as a function of said characteristic transverse profile.

As described above, when a film formed from a polymer in which a cavitating agent is dispersed is subjected to stretching, cavities or voids form at islands of the cavitating agent.

The inventors of the present invention have determined that since the volume of the cavities formed in this way is proportional to the stretching of the film, a stretch profile computed on the basis of mass-per-unit-area profiles of the film before and after stretching characterizes the film and can be obtained while the film is being formed.

Combined with the distribution of a cavitating agent in the film, the stretch profile obtained in this way is an indicator of distribution of the cavities and thus makes it possible to achieve a characterization of the film that takes into account a potentially non-uniform distribution of cavities in said film.

In particular, said stretch profile of the film makes it possible to deduce a density profile of the film, a thickness profile of the film, and a porosity profile of the film, each of which profiles takes into account the distribution and the sizes of the cavities in the film.

Determining the profiles of the manufacturing method of the invention is thus based on measurements of mass per unit area upstream and downstream from a zone in which the film is stretched transversely, and on knowledge of the distribution of the cavitating agent, a priori or by measurement taken in situ on the line.

Since the transverse stretch profile is determined on the basis of mass-per-unit-area measurements taken on the film being formed, said stretch profile gives information based on real characteristics of the film, and not merely on an assumed uniformity of the film or on estimations made on the basis of a posteriori measurements of films manufactured previously.

The longitudinal stretching, i.e. the stretching in the machine direction, may be computed from the same data.

In addition, the method of the invention for measuring the thickness of the film is independent of the type of film formed and of the type of machine used, said method adapting automatically to varied manufacturing environments.

The manufacturing method of the invention may have the following features:

said transverse profile of said concentration by mass of the cavitating agent may be deduced from said transverse mass-per-unit-area profile of the film as stretched and from a mass-per-unit-area profile of cavitating agent as measured by a cavitating agent mass-per-unit-area sensor;

a mass-per-unit-area profile of cavitating agent in the film as not stretched may be measured by a cavitating agent mass-per-unit-area sensor; a transverse profile of concentration by mass of cavitating agent in the film as not stretched may be deduced from said mass-per-unit-area profile of cavitating agent and from said mass-per-unit-area profile of the film as not stretched; and said transverse profile of concentration by mass of cavitating agent in the film as stretched may be replaced with application of the mapping function to said transverse profile of concentration by mass of the cavitating agent in the film as not stretched;

said transverse profile of concentration by mass of the cavitating agent may be assimilated to the mean concentration of the cavitating agent in the film;

the film may undergo a loss of cavitating agent between the two transverse mass-per-unit-area profile measurements; a first cavitating agent mass-per-unit-area sensor may measure a transverse mass-per-unit-area profile of the cavitating agent in the film as not stretched; a second cavitating agent mass-per-unit-area sensor may measure a transverse mass-per-unit-area profile of the cavitating agent in the film as stretched; said computer unit may compute transverse mass-per-unit-area profiles of the film for the polymer alone by subtracting the transverse mass-per-unit-area profiles of cavitating agent from the transverse mass-per-unit-area profiles of the film; and said computer unit may compute said mapping function on the basis of the transverse mass-per-unit-area profiles of the film for the polymer alone;

the manufacturing method may include a first step of stretching the film in a first zone and a second step of extracting cavitating agent from the film in a second zone downstream from the first zone, it being possible for the second mass-per-unit-area sensor to measure said transverse mass-per-unit-area profile of cavitating agent in the film as stretched downstream from the first zone and upstream from the second zone;

said characteristic transverse profile that is characteristic of the film may be a transverse density profile of the film;

said computer unit may compute a transverse thickness profile of the film on the basis of said density profile of the film and of said transverse mass-per-unit-area profile of the film as stretched;

said adjustment actuators may be controlled in response to a deviation in said thickness profile as computed relative to a thickness profile as expected;

said characteristic transverse profile that is characteristic of the film may be a transverse porosity profile of the film;

said adjustment actuators may be controlled in response to a deviation in the porosity profile as computed relative to a porosity profile as expected; and the edges of the film may be cut off and removed while the film is being formed, it being possible for said computer unit to determine said mapping function of the film on the basis of the transverse positions of the edges of the cut-down film.

The invention extends to a film obtained using the manufacturing method of the invention.

BRIEF DESCRIPTION OF THE DRAWINGS

The present invention can be better understood and other advantages appear on reading the following detailed description of an implementation given by way of non-limiting example and with reference to the accompanying drawings, in which.

DESCRIPTION OF A FIRST IMPLEMENTATION OF THE METHOD OF THE INVENTION

In this first implementation, a "pearlized" film F1 is obtained by extruding a polymer in a continuous phase in which a cavitating agent in the form of solid particles is dispersed, and then by simultaneously and/or sequentially longitudinally and transversely stretching the resulting film.

The cavitating agent may be of the inorganic type, e.g. calcium carbonate particles, or of the organic type, e.g. polybutylene terephthalate (PBT), which types of cavitating agent are not miscible in the base polymer of the film, e.g. polypropylene.

In a pearlized film, cavities are formed around the particles of cavitating agent, giving the film a white or pearly appearance while also reducing its density.

Figure 1A:
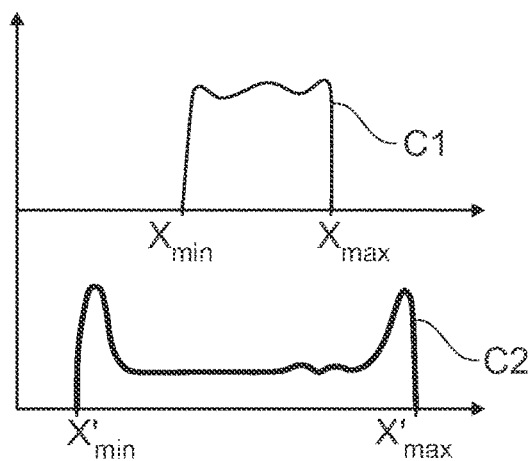
FIG. 1A shows transverse profiles for the mass per unit area or "area density" of a film before and after it is stretched.
Figure 1B:
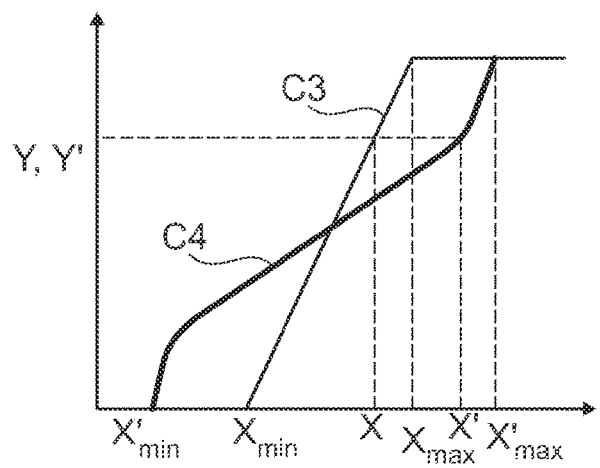
FIG. 1B shows curves of the cumulative profiles of FIGS. 1A and 1B and the definition of a mapping function.
Figure 1C:
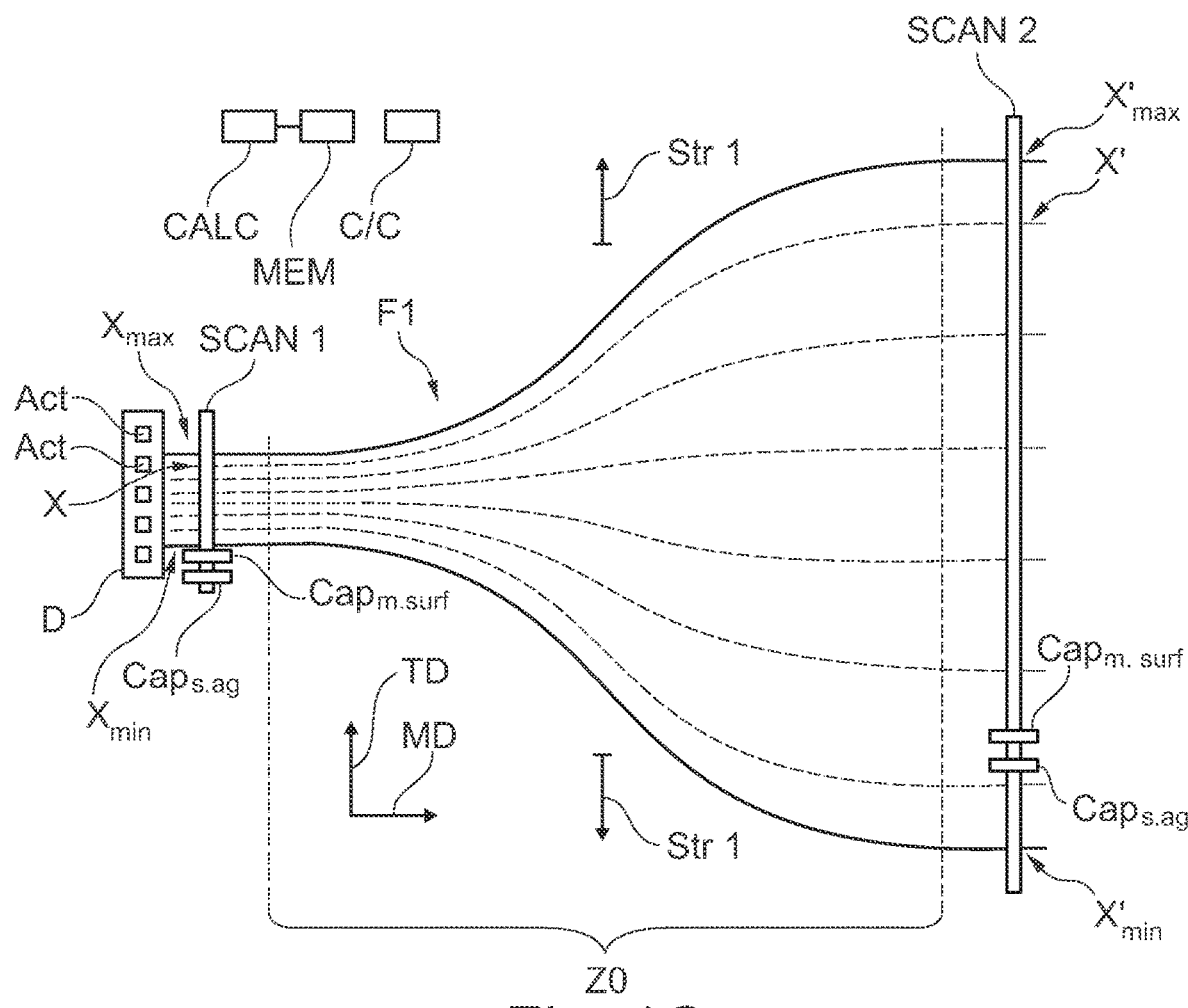
FIG. 1C shows manufacturing of a film using a method including longitudinal and transverse stretching on a production line.

The film F1, firstly extruded through an extrusion die D equipped with adjustment actuators Act for setting the thickness of the film, is produced by a method including transverse stretching Str1 in a zone Z0, the film being moved in a "machine" direction MD along a production line, as shown in FIG. 1C.

It should be noted that longitudinal stretching may be applied to the film concomitantly with the transverse stretching Str1.

The volume of the cavities is a function of the stretching of the film, and at least to the first order, proportional to the stretching of the film, so that determining a stretch profile makes it possible to deduce a porosity profile and a density profile for the film, as described in detail below.

The stretch profile may be computed from the measurement data from scanners equipped with mass-per-unit-area or "area density" sensors.

In order to characterize the thickness of the film, a first scanner SCAN1 and a second scanner SCAN2 are used, each of which includes a respective mass-per-unit-area sensor $Cap_{m.surf}$, and said first and second scanners are configured to scan the film over its entire width, in the transverse direction TD respectively upstream from and downstream from the zone Z0.

The mass-per-unit-area sensors $Cap_{m.surf}$ operate in a manner based on transmission of X rays through the film to be characterized, the transmission varying with the mass per unit area of the film, and each sensor has an X-ray emission head for emitting X-rays and an X-ray detection head for detecting the X-rays passing through the film to be characterized.

Alternatively, the mass-per-unit-area sensor could, for example, be based on transmission or backscattering of beta rays or of some other rays and could have a beta or other ray emission head for emitting beta or other rays and a beta or other ray detection head for detecting the beta or other rays transmitted or backscattered by the film to be characterized.

In a general manner, the measurements may be taken in transmission or in backscattering of electromagnetic rays, or of ultrasound, or of particles.

For backscattering, the emission heads and the detection heads are situated on the same side of the film, optionally incorporated into the same housing or recess.

Between the scanners SCAN1 and SCAN2, the total mass flux of the film is invariant.

In order to quantify the distribution of the cavitating agent in the film, at least one of the scanners SCAN1 and SCAN2 may be equipped with a sensor $Cap_{s.ag}$ capable of detecting the mass per unit area of the cavitating agent contained in the extruded film.

A sensor $Cap_{s.ag}$ may, for example, be based on absorption of infrared rays by the cavitating agent.

Application of the law of conservation of mass between the two scanners SCAN1 and SCAN2 is shown by FIG. 1C, which shows the matter flux lines in the film as subjected to the transverse stretching Str1.

The matter flux between the edge of the film as identified by the co-ordinate $X_{min}$ and any position X at the first scanner SCAN1 should be equal to the matter flux between the edge of the film as identified by the co-ordinate $X_{min}'$ and the corresponding position X' at the second scanner SCAN2, which is expressed by equation (1)

$$v \cdot \int_{X_{min}}^{X} W_s(x)dx = v' \cdot \int_{X_{min}'}^{X'} W_s'(x')dx' \quad (1)$$

where v and v' represent the velocities of movement of the film at the first and second scanners respectively, and $W_s(x)$ and $W_s'(x')$ represent the mass-per-unit-area profiles (generally expressed in g/m²) of the film at the transverse positions x and x' at the levels of the first and second scanners respectively.

Equation 1 may be rewritten independently of the velocities if equation (2) is written that is equivalent to equation (1) for the entire width of the film $$v \cdot \int_{X_{min}}^{X_{max}} W_s(x)dx = v' \cdot \int_{X_{min}'}^{X_{max}'} W_s'(x')dx' \quad (2)$$

and if (1) is divided by (2) to obtain equation (3)

$$\int_{X_{min}}^{X} \frac{W_s(x)}{W_{s.tot}} dx = \int_{X'_{min}}^{X'} \frac{W'_s(x')}{W'_{s.tot}} dx' \quad (3)$$

with integration $W_{s.tot}$ of the mass per unit area over the entire width of the film at the first scanner using equation (4)

$$W_{s.tot} = \int_{X_{min}}^{X_{max}} W_s(x) dx \quad (4)$$

and integration $W_{s.tot}'$ of the mass per unit area over the entire width of the film, edges included, at the second scanner using equation (5)

$$W'_{s.tot} = \int_{X'_{min}}^{X'_{max}} W'_s(x') dx' \quad (5)$$

where the positions $X_{min}'$ and $X_{max}'$ are known because they are positions of the edge of the film, and the masses per unit area $W_s(x)$ and $W_s'(x')$ are measured by the scanners.

Figure 2A:
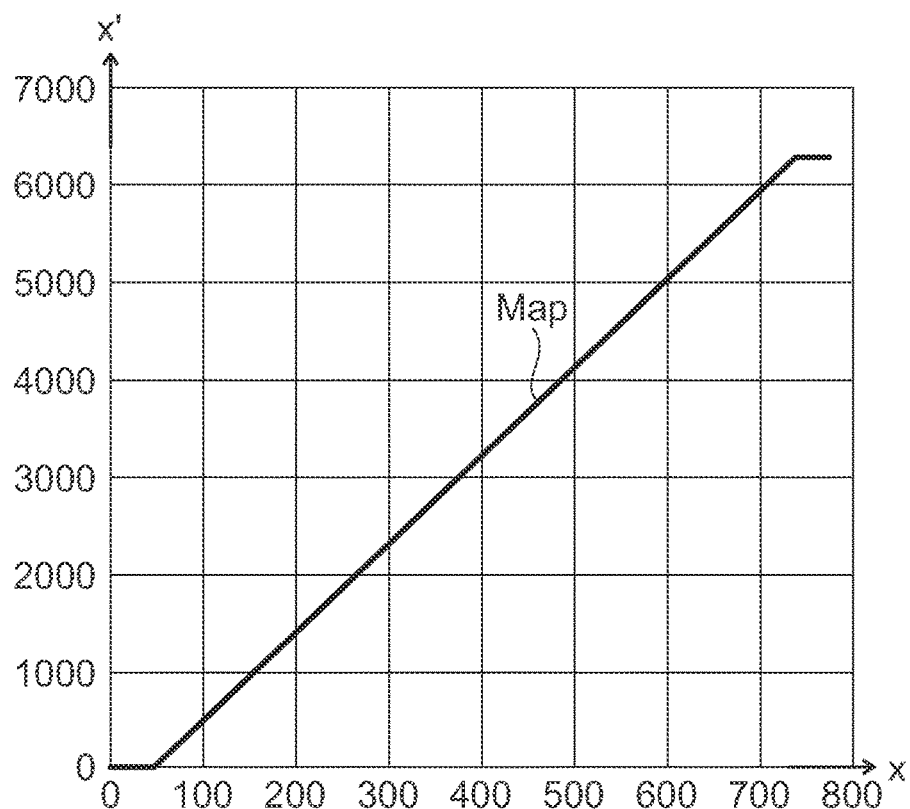
FIG. 2A shows a mapping function of the film of FIG. 1C.

Equation (3) establishes a relationship between any transverse position X in a film at the first scanner SCAN1 and its corresponding position X' at the second scanner SCAN2 by defining an unambiguous relationship between position X and position X', the mapping function, which can be seen graphically by the curve Map shown in the FIG. 2A graph in which the abscissae axis and the ordinates axis represent respective ones of the transverse positions x and x' at the first scanner SCAN1 and at the second scanner SCAN2.

For any transverse position x' after the transverse stretching, the transverse stretch Stretch'TD(x') at the second scanner can be expressed by equation (6)

$$\text{Stretch}'TD(x') = \frac{dx'}{dx} \quad (6)$$

which is the derivative of the mapping function.

For any transverse position x' after the stretching, the total stretch (longitudinal and transverse) Stretch'(x') at the second scanner can be expressed by equation (7)

$$\text{Stretch}'(x') = \frac{W_s(x)}{W_s'(x')} \quad (7)$$

where x is the position corresponding to x' as determined by the mapping function by solving equation (3).

Figure 2B:
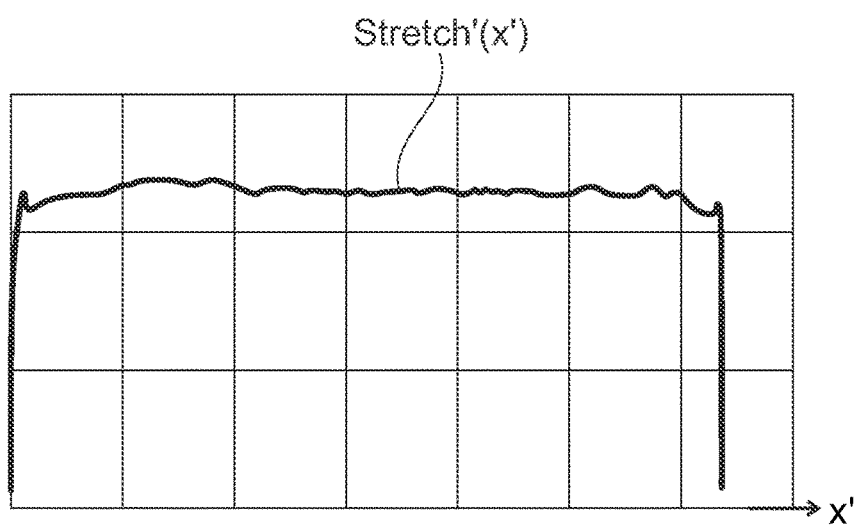
FIG. 2B shows a stretch profile derived from the mapping function of FIG. 2A.

FIG. 2B shows the profile Stretch'(x') of the stretch of the film shown in FIG. 1C at the second scanner SCAN2, as deduced from the mass-per-unit-area measurements taken by the mass-per-unit-area sensors $\text{Cap}_{m.surf}$ and from the processing of equation (7) by conventional mathematical processing means implemented by a computer unit CALC.

The density profile $W_v'(x')$ of the stretched film at a transverse position x' can be expressed by $$W_v'(x') = \frac{W'_{pol}(x') + W'_{ag}(x')}{Vol'_{pol}(x') + Vol'_{ag}(x') + Vol'_{cav}(x')} \quad (8)$$

where $W_{pol}'(x')$ represents the mass of the polymer, $W_{ag}'(x')$ represents the mass of the cavitating agent, $Vol_{pol}'(x')$ represents the volume of the polymer, $Vol_{ag}'(x')$ represents the volume of cavitating agent, and $Vol_{cav}'(x')$ represents the volume of the cavities, as considered in an elementary volume of the film that is located by the co-ordinate x' that is representative of a transverse position after stretching of the film, at the second scanner SCAN2.

Equation (8) may be written in the form of equation (9)

$$W_v'(x') = \frac{\frac{W'_{pol}(x') + W'_{ag}(x')}{Vol'_{pol}(x') + Vol'_{ag}(x')}}{1 + \frac{Vol'_{cav}(x')}{Vol'_{pol}(x') + Vol'_{ag}(x')}} \quad (9)$$

and, with the relative volume of the cavities in the film as stretched being proportional with a proportionality constant α to the cavitating agent concentration $C_{ag}'(x')$ and to the actual stretch Stretch'(x') at the co-ordinate it is possible to express the density profile in the form of equation (10)

$$W_v'(x') = \frac{\frac{W'_{pol}(x') + W'_{ag}(x')}{Vol'_{pol}(x') + Vol'_{ag}(x')}}{1 + \alpha.C'_{ag}(x') \cdot (\text{Stretch}'(x') - 1)} \quad (10)$$

where α represents the effects of the mean characteristics of the film, of the particle size of the cavitating agent and of its interactions with the polymer, and Stretch'(x') depends on the transverse position x'.

The factor (Stretch'(x')−1) is introduced to be consistent with the definition of the stretching that is given above, due to the fact that Stretch'(x') is equal to 1 when there is no stretching or any forming of cavities.

Equation (10) may be written in the form of equation (11)

$$W_v'(x') = \frac{W'_{v.bulk}(x')}{1 + \alpha.C'_{ag}(x') \cdot (\text{Stretch}'(x') - 1)} \quad (11)$$

where $W_{v.bulk}'(x')$ is defined by equation (12), corresponding to a density profile of the film as not stretched at the transverse position i.e. while ignoring the stretching and the cavities:

$$W'_{v.bulk}(x') = \frac{W'_{pol}(x') + W'_{ag}(x')}{Vol'_{pol}(x') + Vol'_{ag}(x')} \quad (12)$$

and $C_{ag}'(x')$ represents the concentration by mass of the cavitating agent in the film, and is defined by equation (13)

$$C'_{ag}(x') = \frac{W'_{s.ag}(x')}{W'_s(x')} \quad (13)$$

where $W_{s.ag}'(x')$ is a mass-per-unit-area profile of the cavitating agent at the second scanner SCAN2, as measured, for example, by a sensor $\text{Cap}_{s.ag}$ equipping that scanner.

On the basis of equation (11), it is possible to determine the transverse density profile $W_v'(x')$, and then to deduce therefrom transverse thickness and porosity profiles of the film being formed, by determining (a) the mapping function of the film between the scanners SCAN1 and SCAN2, (b) the stretch profile Stretch'(x'), (c) the profile $C_{ag}'(x')$ of the concentration by mass of the cavitating agent, (d) the profile $W_{v.bulk}'(x')$ of the density of the film as not stretched, and (e) the value of the constant $\alpha$.

As regards points (a) and (b), the mapping function and the stretch profile Stretch'(x') of the film can be deduced from the mass-per-unit-area measurements taken by the mass-per-unit-area sensors $Cap_{m.surf}$ using respective ones of equations (3) and (7).

As regards point (c), the profile $C_{ag}'(x')$ of the concentration of cavitating agent in the film is given by equation (13).

In the particular situation in which the cavitating agent is distributed uniformly, its concentration-by-mass profile $C_{ag}'(x')$ no longer depends on position, said concentration profile is flat at a constant value equal to the mean concentration of the cavitating agent $C_{ag}$ in the film, and it is no longer necessary to install a sensor for sensing the mass per unit area of the cavitating agent.

As regards point (d), the value $W_{v.bulk}'(x')$ is determined from the densities of the polymer and of the cavitating agent, both of which are known to the person skilled in the art, and from the concentration of cavitating agent, using equation (14)

$$W_{v.bulk}'(x') = \frac{1}{(1 - C_{ag}'(x'))/W_{v.pol} + C_{ag}'(x')/W_{v.ag}} \tag{14}$$

where $W_{v.pol}$ and $W_{v.ag}$ represent respectively the densities of the polymer and of the cavitating agent, which densities are quantities known to the person skilled in the art.

As regards point (e), the constant $\alpha$ is determined by inverting the equation (11) and by using the mean concentration of cavitating agent $C_{ag}$ obtained by averaging equation (13), the mean stretch Stretch' obtained by averaging equation (7), the mean density corresponding to the density of the film as not stretched $W_{v.bulk}'$ obtained by averaging equation (14), and the mean density of the film as stretched measured in the laboratory, which leads to equation (15).

$$\alpha = \frac{W_{v.bulk}' - W_v'}{C_{ag} \cdot (\text{Stretch}' - 1) \cdot W_{v.ag}} \tag{15}$$

It is possible to introduce the porosity P'(x') of the film after stretching that is an essential characteristic of said film and that is defined as the ratio of the volume of the cavities to the total volume of the film and is expressed by equation (16)

$$P'(x') = \frac{Vol_{cav}'(x')}{Vol_{pol}'(x') + Vol_{ag}'(x') + Vol_{cav}'(x')} \tag{16}$$

that can also be derived from equations (9) and (10) by equation (17)

$$P'(x') = 1 - \frac{1}{1 + \alpha \cdot C_{ag}'(x') \cdot (\text{Stretch}'(x') - 1)} \tag{17}$$

with the notations as defined above.

The thickness profile T'(x') of the film can be computed simply by using equation (18)

$$T'(x') = W_s'(x')/W_v'(x') \tag{18}$$

where $W_s'(x')$ represents the mass-per-unit-area of the film, obtained directly from the measurements taken by the second scanner SCAN2, and $W_v'(x')$ represents the transverse density profile of the film at the second scanner, deduced from the measurements taken by the two scanners situated on either side of the stretching zone, as described in detail above, in particular by going via a step of determining the local stretch of the film, not empirically, but, unlike with conventional methods, from measurements of mass per unit area.

Figure 4:
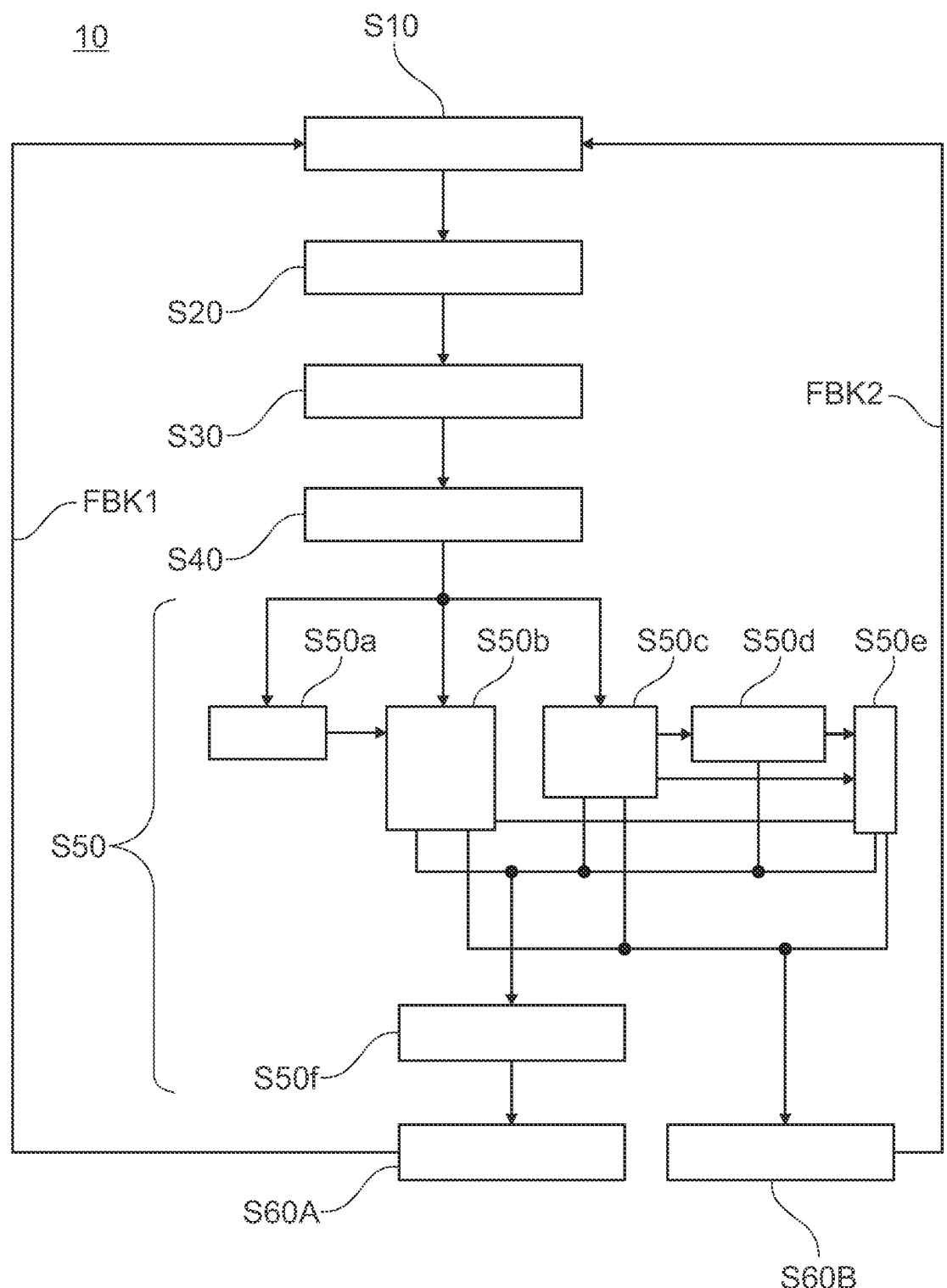
FIG. 4 shows a method of manufacturing the film of FIG. 1C.

Manufacturing the film includes the steps of determining the thickness profile T'(x') and/or the porosity profile P'(x') using the method 10 shown in FIG. 4, described by following the processing of a segment of the film as it advances.

In practice, it is a method taking place continuously in which the time taken to transport the film between the two scanners is taken into account.

In a step S10, the polymer and the cavitating agent mixed with the polymer are extruded through the die D to form a non-stretched film that is conveyed in the machine direction MD.

In step S20, a first mass-per-unit-area sensor $Cap_{m.surf}$ that equips the first scanner SCAN1 and that is controlled by the monitoring and control unit C/C scans over the film, measures a first transverse mass-per-unit-area profile $W_s(x)$ of the film before said film is stretched, and stores data representative of said first mass-per-unit-area profile of the film in a computer memory MEM, the contents of which are accessible to the computer unit CALC.

In step S30, the film is stretched in the machine direction MD and in the transverse direction TD, which is substantially perpendicular to the machine direction MD, sequentially or simultaneously.

In step S40, the second mass-per-unit-area sensor $Cap_{m.surf}$ and the sensor $Cap_{s.ag}$ for sensing the mass per unit area of cavitating agent that equip the second scanner SCAN2 and that are controlled by the monitoring and control unit C/C, scan over the film, respectively measure a second transverse mass-per-unit-area profile $W_s'(x')$ of the film and a transverse mass-per-unit area profile $W_{s.ag}'(x')$ of cavitating agent in the film after stretching, and store data representative of these profiles in the computer memory MEM.

In a step S50, the transverse density profile $W_v'(x')$ of the film is determined after the stretching step S30, on the basis of the first transverse mass-per-unit-area profile $W_s(x)$ and of the second mass-per-unit-area profile $W_s'(x')$, which profiles are measured in respective ones of steps S20 and S40, by solving equation (11) by means of processing by the computer unit CALC of the transverse profiles stored in the computer memory MEM, and of parameters concerning the materials used for the manufacturing (densities of the polymer $W_{v.pol}$ and of the cavitating agent $W_{v.ag}$, and mean density of the film as stretched $W_v$), which are known or are measurable by conventional methods, and the characteristics of the film in question as a whole, which parameters are stored in the computer memory MEM and are accessible to the computer unit CALC.

Step S50 includes sub-step S50a for determining a table representing the mapping function on the basis of the mass-per-unit-area profiles $W_s(x)$ and $W_s'(x')$ as measured by the mass-per-unit-area sensors $Cap_{m.surf}$ during steps S20 and S40, and of the solving of the equation (3) by means of the computer unit CALC, which table is recorded in the computer memory MEM.

Step S50 further includes sub-steps S50$b$, S50$c$, S50$d$ and S50$e$ for determining the individual elements of the right-hand member of the equation (11) by means of the computer unit CALC and of the data of the transverse profiles stored in the computer memory MEM, and then sub-steps S50$f$ of computing the transverse density profile $W_v'(x')$ proper.

Sub-step S50$b$ consists in determining the stretch profile Stretch'(x') from the mass-per-unit-area measurements $W_s(x)$ and $W_s'(x')$ taken by the mass-per-unit-area sensors $Cap_{m.surf}$, from the mapping function determined in step S50$a$ and from the solving of the equation (7) by means of the computer unit CALC.

Optionally, sub-step S50$b$ may include computing the transverse stretch profile Stretch'TD(x') on the basis of equation (6).

Sub-step S50$c$ consists in determining the concentration profile $C_{ag}'(x')$ of cavitating agent in the film by applying equation (13) to the measurements taken by the mass-per-unit-area sensors in step S40.

Sub-step S50$d$ consists in determining the density profile $W_{v.bulk}'(x')$ of the film as not stretched as explained above, by solving equation (14) by using the concentration profile $C_{ag}'(x')$ determined in sub-step S50$c$, by means of the computer unit CALC.

Sub-step S50$e$ consists in determining the proportionality constant $\alpha$, as explained above, on the basis of equation (15) into which the following are introduced: the stretch profile Stretch'(x') determined in step S50$b$, the concentration profile $C_{ag}'(x')$ determined in sub-step S50$c$, and the density profile $W_{v.bulk}'(x')$ of the film as not stretched, which profile is obtained in step S50$d$ by means of the computer unit CALC.

Sub-step S50$f$ consists in using the individual elements determined during sub-steps S50$b$ to S50$e$ for determining the transverse density profile KM, defined by equation (11), by means of the computer unit CALC.

Figure 3A:
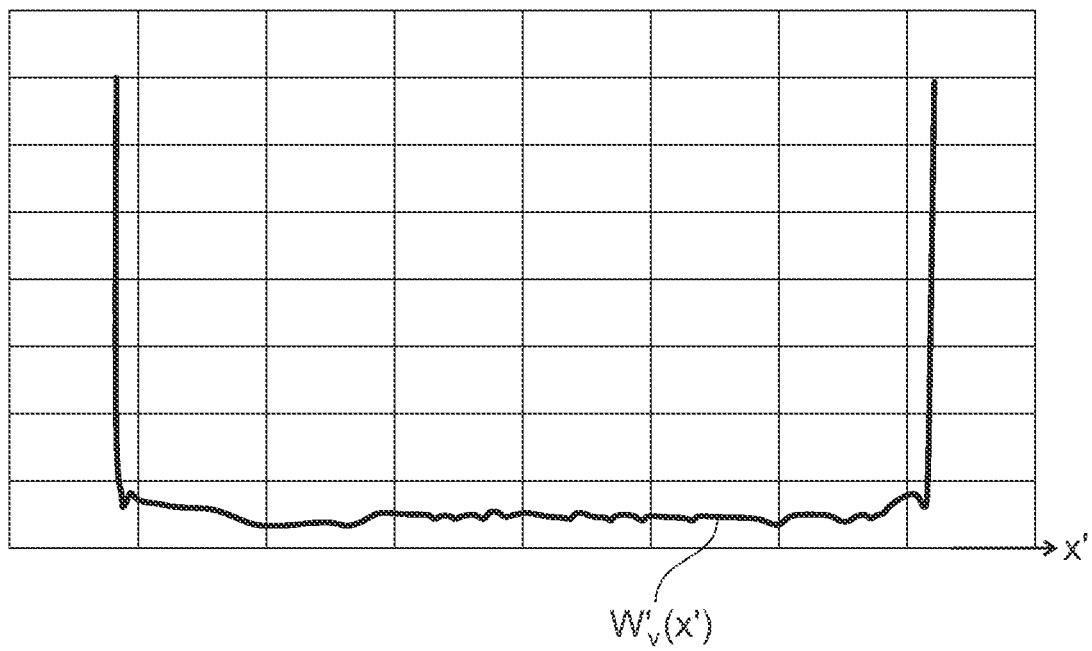
FIG. 3A shows a profile for the density, i.e. mass per unit volume, of the film of FIG. 1A.

FIG. 3A shows a density profile $W_v'(x')$ of the film in FIG. 1C, with, on the edges of the film, portions of the film that are not stretched, as shown by FIG. 2B, the density being substantially equal to the density of a film that is not stretched and thus that does not have any cavities.

In a step S60A, the transverse profile of the thickness T'(x') is determined by solving equation (18) by means of the computer unit CALC, the mass-per-unit-area profile $W_s'(x')$ of the film and the density profile $W_v'(x')$ of the film at the second scanner being known as a result of steps S10 to S50.

This thickness profile T'(x') is a characteristic of the film as stretched and represents a source of information about the method of manufacturing the film, and may be used to act on the method itself by adjusting FBK1 a setting of the equipment for forming the film in response to a deviation of the profile T'(x') relative to an expected thickness profile, as shown by FIG. 4, manually by adjustments made by the person skilled in the art, or indeed automatically by a feedback control loop connecting the computer CALC to the equipment for forming the film.

For example, the extrusion of the polymer forming the film is performed conventionally by thrust between a stationary lip and an adjustable lip of the die D, the thickness of the extruded film being controllable by the actuators Act of the die D, which actuators are distributed along the adjustable lip and the action of which actuators may be adjusted individually in response to the measurement of the transverse profile of the thickness of the film.

In particular, mapping of the film that is determined from the mass-per-unit-area profiles of the film makes it possible to deduce the actuator(s) that it is necessary to adjust as a function of the thickness profile of the film.

Thus, the invention is a method of manufacturing a film that includes the method of measuring thickness profile that is described above as an element of a feedback loop for monitoring and controlling the thickness profile of the film, with the advantage of continuously monitoring the manufacturing method.

Furthermore, in a step S60B, the transverse profile of the porosity P'(x') is determined by solving equation (17) by means of the computer unit CALC, the necessary information being known as a result of steps S10 to S40 and S50$b$, S50$c$ and S50$e$.

Figure 3B:
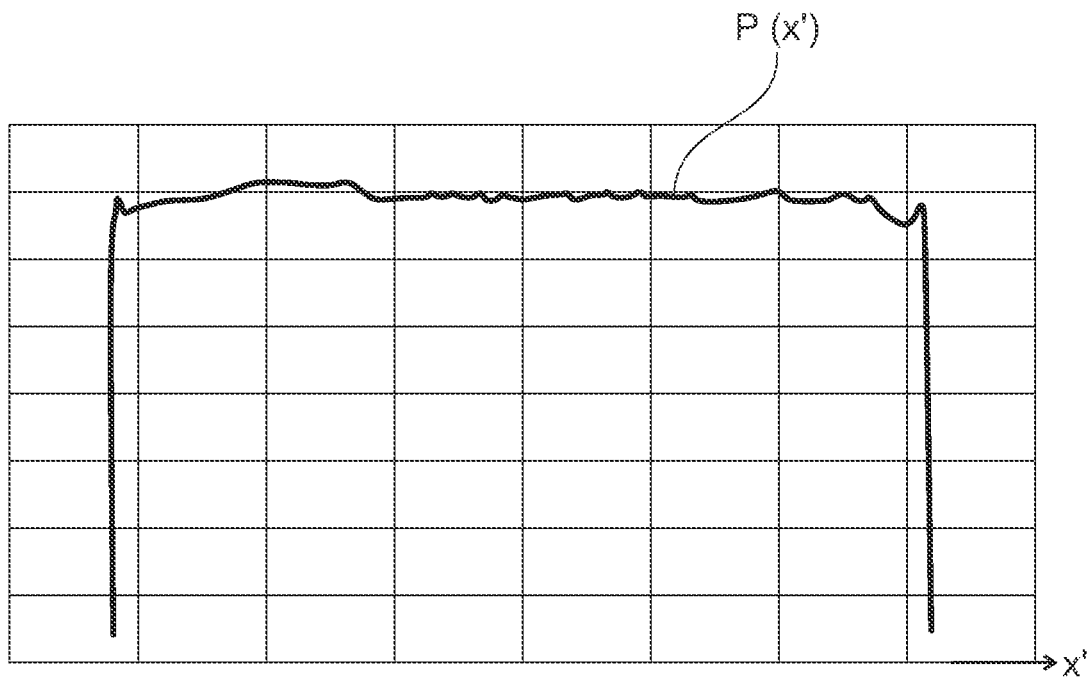
FIG. 3B shows a profile for the porosity of the film of FIG. 1A.

FIG. 3B shows a porosity profile P'(x') of the film shown in FIG. 1C, with very low porosity on the edges of the film, which edges are not stretched and therefore do not have any cavities or only have a few cavities.

This porosity profile P'(x') is a source of information about the method of manufacturing the film, and may be used to act on the method itself by adjusting FBK2 a setting of the equipment for forming the film in response to a deviation in the profile P'(x') relative to an expected porosity profile, as shown by FIG. 4, manually by adjustments made by the person skilled in the art, or indeed automatically by a feedback control loop connecting the computer CALC to the equipment for forming the film.

A method of regulation consists in controlling actuators for adjusting the temperatures of transverse temperature zones in the stretching device included in a production line, in response to the measurement of the transverse porosity profile of the film, in such a manner as to modulate the transverse stretch Stretch$_{TD}'(x')$ to obtain the desired porosity profile.

Thus, the method of the invention for manufacturing a film includes the method of measuring porosity profile that is described above as an element of a feedback loop for monitoring and controlling the porosity profile of the film, with the advantage of continuously monitoring the manufacturing method.

Among the variations in the above method that are accessible to the person skilled in the art, mention may be made of the fact that the cavitating agent profile $W_{s.ag}'(x')$ at the second scanner SCAN2 may be deduced from a measurement of the cavitating agent profile $W_{sag}(x)$ at the first scanner SCAN1 by means of the mapping function.

In another variation, there is no transverse stretching step on the production line for producing the film, but rather only a longitudinal stretching step.

However, stretching in the machine direction can lead to transverse shrinkage of the film, and thus to a stretch profile with values less than one.

The equations defined above continue to apply in the same way, the only difference in this variant being that the adjustment FBK2 is not relevant.

DESCRIPTION OF A SECOND IMPLEMENTATION OF THE METHOD OF THE INVENTION

This second implementation constitutes a particular case of the first implementation in that the cavitating agent may be removed from the film partially or totally due to the nature of the film in question and to the processing that is applied to it between the scanners SCAN1 and SCAN2.

Therefore, the assumption of the mass flux between two scanners being conserved that is made in the first implementation becomes invalid and it is necessary to take into account the loss of mass in the method and in the computations.

Thus, it is possible to refer to the first implementation for the approach applied to the manufacturing method and for the type of equipment used, in particular for the mass-per-unit-area sensors and the actuators.

Figure 5:
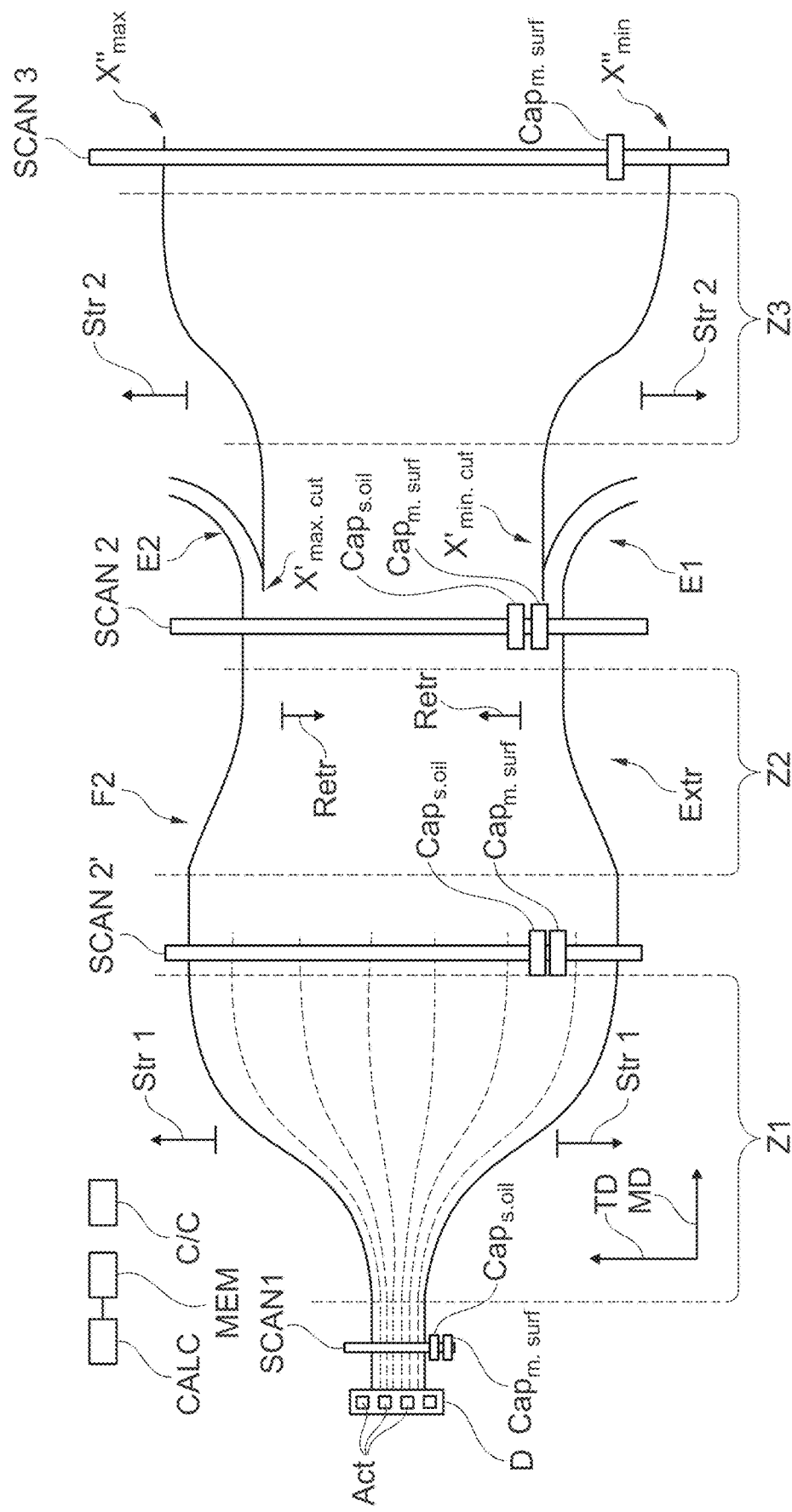
FIG. 5 shows a method of manufacturing a microporous membrane including a plurality of stretching steps on a production line.

By way of example, in this second implementation, the film in question is a microporous polymer membrane that may be produced from a film F2 produced continuously by extrusion of a polymer solution, the film being moved in a "machine" direction MD along a production line, as shown in FIG. 5.

A particular application of a microporous membrane is to manufacturing of membranes that are to serve the function of physically separating the cathodes and the anodes of battery cells while also enabling the electric charge carriers to travel from an anode to a cathode through the pores of the membrane.

In the context of this second implementation, it is explained how the following are determined: a stretch profile, a porosity profile, a density profile, and a thickness profile of a microporous membrane prepared from a polymer solution comprising a polymer resin and an oil used as a cavitating agent.

The polymer resin may be a polyolefin such as polyethylene or polypropylene and the cavitating agent may be a paraffin oil, as described in International Patent Application WO 2008/016174 and in U.S. Pat. No. 8,841,032.

The film undergoes a first method step in a first zone Z1, during which step it is stretched by stretching Str1 and cavities are formed at the oil inclusions, which cavities subsequently give pores in the microporous membrane.

The stretching Str1 combines longitudinal stretching and transverse stretching.

During the first step, some of the oil of the film is generally lost.

During a second method step, namely a step Extr of extracting oil in a zone Z2 downstream from zone Z1, the film stretched by the first stretching Str1 goes through a bath of solvent that dissolves the oil contained in the pores, and the pores are then emptied of the oil by a mechanism for extracting the solvent-and-oil mixture.

During this second method step, and in particular during extraction of the mixture, the film undergoes shrinkage Retr.

Optionally, a second stretching step Str2 implemented during a third method step in a zone Z3 downstream from zone Z2 aims to correct the shrinkage of the film that took place during the extraction of the mixture.

As in the first implementation, the volume of the cavities is a function of the stretching of the film, and at least to the first order, proportional to the stretching of the film, so that determining a stretch profile makes it possible to deduce a porosity profile, a density profile, and a thickness profile for the film, as described in detail below.

Conversely, this second implementation differs from the first implementation in that the cavitating agent (the oil in the present case) is removed as completely as possible from the film in a processing zone between two measurements of mass per unit area.

Therefore, the conservation of the mass flux, which makes it possible to establish a mapping function between a position of the film before and a position of the film after the processing zone in question, no longer applies to the total mass per unit area but rather to the mass of the polymer only.

Thus, equations (1) to (7) remain valid, provided that the total mass-per-unit-area profiles $W_s(x)$ and $W_s'(x')$ are replaced with the mass-per-unit-area profiles of the polymer $W_{s.pol}(x)$ and $W_{s.pol}'(x')$.

In this embodiment, scanners SCAN1 and SCAN2 situated respectively upstream from the first zone Z1 and downstream from the second zone Z2 perform the same functions as the scanners SCAN1 and SCAN2 of the first implementation, zones Z1 and Z2 performing the function of zone Z0 of the first implementation.

The mass-per-unit-area sensors $Cap_{m.surf}$ measure total mass-per-unit-area profiles $W_s(x)$ and $W_s'(x')$, respectively at the first scanner SCAN1 and at the second scanner SCAN2, and are sensitive to all of the sensed matter, which, in addition, to the polymer, includes the oil, most of which is removed between the first and the second scanner.

These sensors thus measure the mass per unit area of the constituents of the film taken as a whole, and not only the masses per unit area of the polymer forming the extruded film.

In order to quantify the oil loss of the film, the first scanner SCAN1 may be equipped with a sensor $Cap_{s.oil}$ capable of sensing a mass-per-unit-area profile $W_{s.oil}(x)$ of the oil alone that is contained in the extruded film, and the second scanner SCAN2 may optionally be equipped with another sensor $Cap_{s.oil}$ for measuring the mass-per-unit-area $W_{s.oil}'(x')$ of the oil residues after the stretching and extraction steps, in particular in the edges of the film, at the second scanner SCAN2.

The mass-per-unit-area profiles of the polymer $W_{s.pol}(x)$ and $W_{s.pol}'(x')$ at the first scanner and at the second scanner are respectively obtained by subtraction between the total mass-per-unit-area profiles and the corresponding mass-per-unit-area profiles of the oil $W_{s.oil}(x)$ and $W_{s.oil}'(x')$ using equations (19) and (20), respectively.

$$W_{s.pol}(X)=W_s(x)-W_{s.oil}(x) \tag{19}$$

$$W_{s.pol}'(x')=W_s'(x')-W_{s.oil}'(x') \tag{20}$$

Alternatively and in equivalent manner, the scanner SCAN1 and/or the scanner SCAN2 may be equipped with one or more sensors capable of sensing the mass per unit area of the polymer alone contained in the extruded film.

A sensor $Cap_{s.oil}$ for sensing the mass-per-unit area of oil and a sensor for sensing the polymer alone contained in the film may, for example, be based on sensing the absorption of infrared rays respectively by the oil and by the polymer.

On the basis of these equations, the mapping function is defined using equation (21) in a manner analogous to the first implementation with the same notations X, $X_{min}$, X' and $X_{min}'$ $$\int_{X_{min}}^{X} \frac{W_{s.pol}(x)}{W_{s.pol.tot}} dx = \int_{X'_{min}}^{X'} \frac{W'_{s.pol}(x')}{W'_{s.pol.tot}} dx' \tag{21}$$

where $W_{s.pol.tot}$ and $W_{s.pol.tot}'$ are respectively the integrals of mass-per-unit area profiles $W_{s.pol}(x)$ and $W_{s.pol}'(x')$ over the entire width of the film at the first scanner and at the second scanner.

In order to obtain the expression of the stretch, equation (7) may be adapted to this second implementation to give equation (22).

$$\text{Stretch}'(x') = \frac{W_{s.pol}(x)}{W'_{s.pol}(x')} \quad (22)$$

In a manner analogous to the first implementation, it is possible to consider that the volume of the cavities is proportional to the oil concentration before stretching.

However, since the oil is extracted as far as possible, measuring its concentration at the second scanner SCAN2 does not provide the information necessary for computing the distribution of the cavities.

Conversely, that information may be obtained from the concentration of oil measured at the first scanner SCAN1 and from the mapping function using equation (21).

Equation (23) expresses the oil concentration profile $C_{oil}(x)$ at SCAN1, before stretching $$C_{oil}(x) = \frac{W_{s.oil}(x)}{W_s(x)} \quad (23)$$

and the mapping function (21) makes it possible to express the distribution profile $C_{site}'(x')$ for the distribution of the sites of the cavities generated by the presence of oil and by the stretching Str1 upstream from the step of extracting oil from zone Z2, expressed by equation (24).

$$C_{site}'(x')=C_{oil}(x) \quad (24)$$

This quantity plays a part equivalent to $C_{ag}'(x')$ in the first implementation.

Equation (11) may be rewritten to give equation (25) that expresses the density profile of the film with its cavities but without the residual oil $$W_v'(x') = \frac{W_{v.pol}}{1 + \alpha \cdot C'_{site}(x') \cdot (\text{Stretch}'(x') - 1)} \quad (25)$$

where, therefore, the density of the polymer $W_{v.pol}$, of known value replaces $W_{v.bulk}'(x')$.

In this situation, the proportionality constant $\alpha$ is expressed by equation (26), which is equivalent to equation (15) of the first implementation $$\alpha = \frac{W_{v.pol} - W_v'}{C'_{site} \cdot (\text{Stretch}' - 1)W_v'} \quad (26)$$

where the mean concentration of cavity sites $C_{site}'$ is determined by averaging equation (24), the mean stretch Stretch' is obtained by averaging equation (22) and the mean density of the stretched film $W_v'$ is as measured in the laboratory.

In a manner analogous to the first implementation, the thickness profile $T'(x')$ and the porosity profile $P'(x')$ at the second scanner SCAN2 are expressed respectively by equations (27) and (28).

$$T'(x') = W'_{s.pol}(x')/W_v'(x') \quad (27)$$

$$P'(x') = 1 - \frac{1}{1 + \alpha \cdot C'_{site}(x') \cdot (\text{Stretch}'(x') - 1)} \quad (28)$$

FIG. 5 shows the third method zone Z3 downstream from the second zone Z2, with a step of removing edges E1 and E2 of the film F2 by cutting them off after going past the second scanner SCAN2 and before the second stretching Str2.

FIG. 5 shows a third scanner SCAN5 equipped with a third mass-per-unit-area sensor $\text{Cap}_{m.surf}$ configured to scan the cut-down film over its entire width in the transverse direction TD, downstream from the third zone Z3 of the film.

Downstream from the second scanner, blades (not shown in the figure) cut off and remove the outer edges E1 and E2 of the film, so that the edges of the cut-down film that are identified by the co-ordinates $X_{min.cut}'$ and $X_{max.cut}'$ correspond to a reduction in the width of the film.

Due to the edges of the film being cut off and removed, conservation of the mass flux of the film concerns only the zone lying between the positions $X_{min.cut}'$ and) $X_{max.cut}'$, which leads to equation (1) being transformed into equation (29)

$$v' \cdot \int_{X_{min.cut}'}^{X'} W_s'(x')dx' = v'' \cdot \int_{X_{min}''}^{X''} W_s''(x'')dx'' \quad (29)$$

where $X_{min}''$, $v''$, $W_s''(x'')$, and $X''$ represent respectively a transverse position of a first edge of the film, the velocity of movement of the film, the mass-per-unit-area profile, and any transverse position in the film, each at the third scanner SCAN3, the other elements of the equation being as defined above.

The integration $W_{s.cut}'$ of the mass per unit area over the entire width of the film after the cutting off and before the stretching Str2 is expressed by equation (30)

$$W'_{s.cut} = \int_{X'_{min.cut}}^{X'_{max.cut}} W_s'(x')dx' \quad (30)$$

and the integration $W_{s.tot}''$ of the mass per unit area over the entire width of the film at the third scanner gives equation (31)

$$W''_{s.tot} = \int_{X''_{min}}^{X''_{max}} W_s''(x'')dx'' \quad (31)$$

where $X_{max}''$ represents the transverse position of the second edge of the film at the third scanner SCAN3.

The equation that makes it possible to define the mapping function between the second scanner SCAN2 and the third scanner SCAN3 can be extrapolated from equation (3) by equation (32).

$$\int_{X'_{min.cut}}^{X'} \frac{W_s'(x')}{W'_{s.cut}} dx' = \int_{X''_{min}}^{X''} \frac{W_s''(x'')}{W''_{s.tot}} dx'' \quad (32)$$

The mapping function defined by equation (32) makes it possible to make any transverse position x" at the third scanner SCAN3 correspond to a transverse position x' at the second scanner SCAN2 after the shrinkage Retr, and thus to define the porosity profile P"(x") at the third scanner on the basis of the porosity profile at the second scanner.

The local porosity remains unchanged due to the absence of formation of new cavities and because the existing cavities and the entire volume of the film are deformed in the same way, which gives equation (33)

$$P''(x'')=P'(x') \quad (33)$$

where P"(x") is the porosity profile of the film at the third scanner at a transverse position e.

Like porosity, the local density remains unchanged to a first approximation, and is thus expressed by equation (34)

$$W_v''(x'')=W_v'(x') \tag{34}$$

where $W_v''(x'')$ is the density profile at the third scanner.

The thickness profile $T''(x'')$ at the third scanner is then deduced from that density profile by means of equation (35).

$$T''(x'')=W_s''(x'')/W_v''(x'') \tag{35}$$

For explanatory reasons, it is considered that the loss of solvent is zero or negligible at the stretching zone Z3, but it is naturally possible to take such a loss into account, in a manner analogous to what is proposed for the first stretching zone Z1.

The method of determining a thickness profile of the film at the third scanner is similar to the method of determining thickness profile at the second scanner, but further includes a step of storing, in the computer memory MEM, the transverse co-ordinates $X_{min.cut}'$ and $X_{max.cut}'$ of the edges of the film after the cutting off and before the second stretching Str2 for use by the computer unit CALC.

Any cutting off of film edges could be taken into account by the person skilled in the art by means of the above-described method, e.g. combined with the first implementation or with the processing of the film F2 in zones Z1 and/or Z2 of the second implementation.

Figure 6:
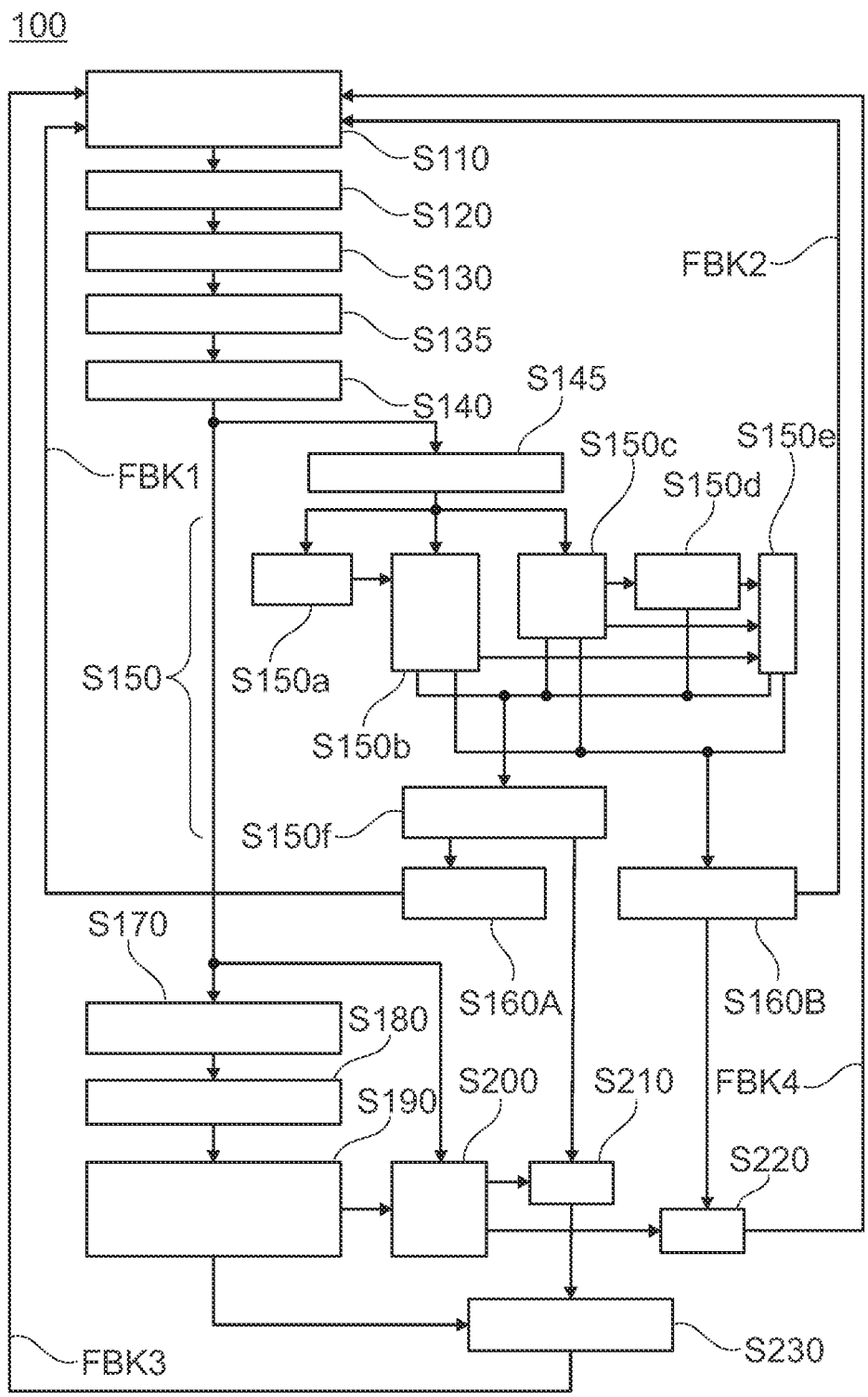
FIG. 6 shows a method of manufacturing the microporous membrane of FIG. 5.

Manufacturing the film includes the steps of determining the thickness profile $T''(x'')$ and follows the method 100 shown by FIG. 6, described by following the processing of a segment of the film that is moving.

In practice, it is a method taking place continuously in which the time taken to transport the film between the various scanners is taken into account.

In a step S110, the polymer and the oil mixed with the polymer are extruded through the die D to form a non-stretched film that is conveyed in the machine direction MD.

In a step S120, a first total mass-per-unit-area sensor $Cap_{m.surf}$ and an oil mass-per-unit-area sensor $Cap_{s.oil}$ that equip the first scanner SCAN1 and that are controlled by a monitoring and control unit C/C scan over the film, measure respectively a first total mass-per-unit area profile $W_s(x)$ of the film and a first oil mass-per-unit area profile $W_{s.oil}(x)$ of the oil in the film, before the film is stretched Str1, and store data representative of said first profiles in a computer memory MEM.

In a step S130, the film is stretched in the transverse direction TD, which is substantially perpendicular to the machine direction MD, and then the oil is extracted from the film as completely as possible in a step S135.

In a step S140 following the step S130, a second total mass-per-unit-area sensor $Cap_{m.surf}$ and an oil mass-per-unit area sensor $Cap_{s.oil}$ that equip the second scanner SCAN2 and that are controlled by the monitoring and control unit C/C scan over the film, measure respectively a second transverse total mass-per-unit-area profile $W_s'(x')$ of the film and a second transverse oil mass-per-unit-area profile $W_{s.oil}'(x')$ of the oil in the film after the film is stretched Str1, and store data representative of these profiles in the computer memory MEM.

In a step S145, the computer unit CALC computes (1) the transverse mass-per-unit-area profile $W_{s.pol}(x)$ of the polymer alone at the first scanner SCAN1 by subtracting the first transverse oil mass-per-unit-area profile $W_{s.oil}(x)$ from the first total mass-per-unit area profile $W_s(x)$ of the film and (2) the transverse mass-per-unit area profile $W_{s.pol}'(x')$ of the polymer alone at the second scanner SCAN2 by subtracting the second transverse oil mass-per-unit-area profile $W_{s.oil}'(x')$ of the oil in the film from the second transverse total mass-per-unit-area profile $W_s'(x')$ of the film, and these profiles are stored in the computer memory MEM.

In a step S150, the computer unit CALC computes the transverse density profile $W_v'(x')$ of the film after the step S130 of stretching Str1, on the basis of the first transverse mass-per-unit-area profile $W_s(x)$ and of the second mass-per-unit-area profile $W_s'(x')$, measured in respective ones of steps S120 and S140, by solving equation (25) by means of processing by the computer unit CALC of the transverse profiles stored in the computer memory MEM, and of parameters that are known or that are measurable by conventional methods and that concern the materials used for the manufacturing and the characteristics of the film considered as a whole, which parameters are stored in the computer memory MEM and are accessible to the computer unit CALC.

Step S150 includes sub-step S150a for determining a table representing the mapping function on the basis of the transverse mass-per-unit-area profiles $W_{s.pol}(x)$ and $W_{s.pol}'(x')$ of the polymer alone that are obtained in step S145 and of the solving of equation (21) by means of the computer unit CALC.

Step S150 further includes sub-steps S150b, S150c, S150d and S150e for determining individual elements of the right-hand member of equation (25) by means of the computer unit CALC and of the data of the transverse profiles stored in the computer memory MEM, and then sub-step S150f of computing the transverse density profile $W_v'(x')$ proper.

Sub-step S150b consists in determining the stretch profile Stretch'(x') from the transverse mass-per-unit-area profiles of the polymer alone that are obtained in step S145, from the mapping function determined in step 150a, and from the solving of equation (22) by means of the computer unit CALC.

Sub-step S150c consists in determining the distribution profile $C_{site}'(x')$ for the distribution of the sites of the cavities generated in the film by applying equation (23) to the measurements taken by the mass-per-unit-area sensors in step S120.

In this implementation, step S50d of the method of the first implementation has no equivalent in computation terms since the density of the polymer $W_{v.pol}$ is a known quantity.

Step S150d of the second implementation consists, for the computer unit CALC, in retrieving the value of the density of the polymer $W_{v.pol}$ that is stored in the computer memory MEM.

Sub-step S150e consists in determining the proportionality constant $\alpha$, on the basis of equation (26) into which the averaged values Stretch' and $C_{site}'$ for the profiles established in respective ones of steps S150b and S150c are introduced, and on the basis of a value $W_v'$ for the density of the film, which value is obtained by measurements in the laboratory, by means of the computer unit CALC, the density of the polymer $W_{v.pol}$ being known.

Sub-step S150f consists in using the individual elements determined during sub-steps S150b, S150c and S150e for determining the transverse density profile $W_v'(x')$ by using equation (25) by means of the computer unit CALC.

In step S160A, the transverse thickness profile T'(x') is determined by solving equation (29) by means of the computer unit CALC, the mass per unit area $W_{s.pol}'(x')$ of the film and the density $W_v'(x')$ of the film at the second scanner being known as a result of steps S110 to S150.

In addition, in a step S160B, the transverse profile of the porosity P'(x') is determined by solving equation (28) by means of the computer unit CALC, the necessary information being known as a result of steps S110 to S150.

In the same way as the thickness profile T'(x') and the porosity profile P'(x') at the second scanner SCAN2 in the first implementation, the thickness profile T'(x') and the porosity profile P'(x') of the second implementation may be used to act on the manufacturing method by adjusting settings of the equipment for forming the film in response to deviations of the profiles from expected profiles, FBK1 and FBK2 respectively, as shown by FIG. 6.

In step S170, the edges of the film are cut off and the positions of the new edges of the film after the cutting off are recorded in the memory MEM by the monitoring and control unit C/C, the positions of the cutting blades being known.

In a step S180, second stretching Str2 of the film is performed in zone Z3.

In a step S190, a third total mass-per-unit-area sensor $Cap_{m.surf}$ equipping the third scanner SCANS and controlled by a monitoring and control unit C/C, scans over the film, measures a third transverse total mass-per-unit-area profile $W_s''(x'')$ of the film after the second stretching Str2 and stores data representative of said third mass-per-unit-area profile of the film in the computer memory MEM, using a method analogous to the method in steps S120 and S140.

In a step S200, a table is determined that represents the mapping function on the basis of the second transverse mass-per-unit area profile $W_s'(x')$ and of the third transverse mass-per-unit-area profile $W_s''(x'')$ that are measured in respective ones of steps S140 and S190, and on the basis of the solving of equation (32) by means of the computer unit CALC.

In a step S210, the transverse density profile $W_v''(x'')$ of the film after step S180 of stretching Str2 is determined on the basis of the density profile at the second scanner $W_v'(x')$ as determined in step S150 and of the table representing the mapping function determined in step S200, by solving the equation (34) by means of processing by the computer unit CALC.

In a step S220, the transverse porosity profile $P''(x'')$ of the film at the third scanner is determined on the basis of the porosity profile P'(x') at the second scanner as determined in step S160B and on the basis of the mapping function determined in step S200, by solving equation (33) by means of processing by the computer unit CALC.

In a step S230, the transverse thickness profile $T''(x'')$ is determined by solving equation (35) by means of the computer unit CALC, the mass-per-unit area $W_s''(x'')$ of the film and the density $W_v''(x'')$ of the film at the third scanner being respectively known as a result of steps S190 and S210.

In the same way as the thickness profile T'(x') and the porosity profile P'(x') at the second scanner SCAN2, the thickness profile T''(x'') and the porosity profile P''(x'') may be used to act on the method itself by adjustments FBK3 and FBK4 of settings of the equipment for forming the film in response to respective deviations in these profiles relative to expected thickness and porosity profiles, as shown in FIG. 6.

Optionally and in simplified manner, certain situations allow approximation to be performed that consists in considering that the content by mass $C_{oil}$ of oil in the extruded film is independent of the transverse position, which enables us to replace equation (19) with equation (36).

$$W_{s.pol}(x) = (1 - C_{oil}) \cdot W_s(x) \quad (36)$$

Similarly, it is also possible to consider that the residual oil content after the step of extraction from zone Z2 is zero, which enables us to replace $W_{s.pol}'(x')$ with $W_s'(x')$.

Thus, we obtain a variation of the second implementation, in which variation the density, the thickness, and the porosity are obtained without using sensors $Cap_{s.oil}$.

Also optionally, a fourth scanner SCAN2' equipped with a total mass-per-unit-area sensor $Cap_{m.surf}$ and an oil mass-per-unit-area sensor $Cap_{s.oil}$ could be placed between zones Z1 and Z2 in order to characterize the first stretching Str1 and the loss of oil during said stretching.

Using this fourth scanner can procure the following advantages.

By applying the set of equations (21) to (28) between the scanners SCAN1 and SCAN2', it is possible to compute much more rapidly a first approximation of the porosity profile and of the thickness profile insofar as the method of extracting from zone Z2 adds a lapse of time following the method in zone Z1.

This makes it possible for faster feedback on the method than if the results of scanner SCAN2 or of scanner SCANS were used.

In addition, the scanner SCAN2' makes it possible to determine the loss of oil during the method in zone Z1 and to characterize the quality of the stretching Str1.

The cavitating agent is oil in this implementation, but the invention is not limited to that material.

If a cavitating agent other than oil is used, the person skilled in the art uses adapted mass-per-unit area sensors.

The above-described implementations apply to a category of films that is commonly referred to as "pearlized" films and to battery separator films or "BSFs", but the invention may also apply to any other type of porous membrane, such as, for example, breathable membranes or fuel cell membranes.

Naturally, the present invention is in no way limited to the above-described implementations, which can undergo modifications without going beyond the ambit of the invention.

What is claimed is:

1. A method of manufacturing a film including cavities and formed from a polymer in which a cavitating agent is dispersed, said method including a step of extruding the polymer on a production line equipped with adjustment actuators for adjusting thickness of the extruded film, and a step of stretching the film, as well as a step consisting in establishing a mapping function of the film, wherein:
   a first mass-per-unit-area sensor measures a transverse mass-per-unit-area profile of the film as not stretched;
   a second mass-per-unit-area sensor measures a transverse mass-per-unit-area profile of the film as stretched by said stretching;
   a cavitating agent mass-per-unit-area sensor which measures a transverse mass-per-unit-area profile of cavitating agent;
   a computer unit computes said mapping function of the film as stretched on the basis of said transverse mass-per-unit-area profiles;
   said computer unit computes a stretch profile of the film as stretched on the basis of said mapping function and of said transverse mass-per-unit-area profiles;
   said computer unit computes a characteristic transverse profile that is characteristic of the film on the basis of said stretch profile and of a transverse profile of the concentration by mass of cavitating agent in the film as stretched that makes it possible to take into account the distribution of the cavities in the film; and
   said adjustment actuators are controlled as a function of said characteristic transverse profile.

2. The method of manufacturing a film according to claim 1, wherein said transverse profile of said concentration by mass of the cavitating agent is deduced from said transverse mass-per-unit-area profile of the film as stretched and from a mass-per-unit-area profile of cavitating agent as measured by the cavitating agent mass-per-unit-area sensor.

3. The method of manufacturing a film according to claim 1, wherein the edges of the film are cut off and removed while the film is being formed, said computer unit determining said mapping function of the film on the basis of the transverse positions ($X_{min.cut}'$, $X_{max.cut}'$) of the edges of the cut-down film.

4. The method of manufacturing a film according to claim 1, wherein:
the mass-per-unit-area profile of cavitating agent in the film as not stretched is measured by the cavitating agent mass-per-unit-area sensor;
a transverse profile of concentration by mass of cavitating agent in the film as not stretched is deduced from said mass-per-unit-area profile of cavitating agent and from said mass-per-unit-area profile of the film as not stretched; and
said transverse profile of concentration by mass of cavitating agent in the film as stretched is replaced with application of the mapping function to said transverse profile of concentration by mass of the cavitating agent in the film as not stretched.

5. The method of manufacturing a film according to claim 4, wherein: the film undergoes a loss of cavitating agent between the two transverse mass-per-unit-area profile measurements; wherein the cavitating agent mass-per-unit area sensor comprises-a first cavitating agent mass-per-unit-area sensor which measures a transverse mass-per-unit-area profile of the cavitating agent in the film as not stretched; and a second cavitating agent mass-per-unit-area sensor which measures a transverse mass-per-unit-area profile of the cavitating agent in the film as stretched; said computer unit computes transverse mass-per-unit-area profiles of the film for the polymer alone by subtracting the transverse mass-per-unit-area profiles of cavitating agent from the transverse mass-per-unit-area profiles of the film; and said computer unit computes said mapping function on the basis of the transverse mass-per-unit-area profiles of the film for the polymer alone.

6. The method of manufacturing a film according to claim 1, wherein said transverse profile of concentration by mass of the cavitating agent is assimilated to the mean concentration of the cavitating agent in the film.

7. The method of manufacturing a film according to claim 6, wherein: the film undergoes a loss of cavitating agent between the two transverse mass-per-unit-area profile measurements; wherein the cavitating agent mass-per-unit area sensor comprises-a first cavitating agent mass-per-unit-area sensor which measures a transverse mass-per-unit-area profile of the cavitating agent in the film as not stretched; and a second cavitating agent mass-per-unit-area sensor which measures a transverse mass-per-unit-area profile of the cavitating agent in the film as stretched; said computer unit computes transverse mass-per-unit-area profiles of the film for the polymer alone by subtracting the transverse mass-per-unit-area profiles of cavitating agent from the transverse mass-per-unit-area profiles of the film; and said computer unit computes said mapping function on the basis of the transverse mass-per-unit-area profiles of the film for the polymer alone.

8. The method of manufacturing a film according to claim 1, wherein:
the film undergoes a loss of cavitating agent between the two transverse mass-per-unit-area profile measurements;
wherein the cavitating agent mass-per-unit area sensor comprises
a first cavitating agent mass-per-unit-area sensor which measures a transverse mass-per-unit-area profile of the cavitating agent in the film as not stretched; and
a second cavitating agent mass-per-unit-area sensor which measures a transverse mass-per-unit-area profile of the cavitating agent in the film as stretched;
said computer unit computes transverse mass-per-unit-area profiles of the film for the polymer alone by subtracting the transverse mass-per-unit-area profiles of cavitating agent from the transverse mass-per-unit-area profiles of the film; and
said computer unit computes said mapping function on the basis of the transverse mass-per-unit-area profiles of the film for the polymer alone.

9. The method of manufacturing a film according to claim 8, wherein said step of stretching the film takes place in a first zone and is followed by a step of extracting cavitating agent from the film in a second zone downstream from the first zone, the second mass-per-unit-area sensor measuring said transverse mass-per-unit-area profile of cavitating agent in the film as stretched downstream from the first zone and upstream from the second zone.

10. The method of manufacturing a film according to claim 9, wherein said characteristic transverse profile that is characteristic of the film is a transverse density profile of the film.

11. The method of manufacturing a film according to claim 9, wherein said characteristic transverse profile that is characteristic of the film is a transverse porosity profile of the film.

12. The method of manufacturing a film according to claim 1, wherein said characteristic transverse profile that is characteristic of the film is a transverse density profile of the film.

13. The method of manufacturing a film according to claim 12, wherein said computer unit computes a transverse thickness profile of the film on the basis of said density profile of the film and of said transverse mass-per-unit-area profile of the film as stretched.

14. The method of manufacturing a film according to claim 13, wherein said adjustment actuators are controlled in response to a deviation in said thickness profile as computed relative to a thickness profile as expected.

15. The method of manufacturing a film according to claim 1, wherein said characteristic transverse profile that is characteristic of the film is a transverse porosity profile of the film.

16. The method of manufacturing a film according to claim 15, wherein said adjustment actuators are controlled in response to a deviation in said porosity profile as computed relative to a porosity profile as expected.

17. The method of manufacturing a film according to claim 16, wherein the edges of the film are cut off and removed while the film is being formed, said computer unit determining said mapping function of the film on the basis of the transverse positions ($X_{min.cut}'$, $X_{max.cut}'$) of the edges of the cut-down film.

* * * * *